United States Patent [19]

Herbst et al.

[11] 4,370,724

[45] Jan. 25, 1983

[54] CIRCUIT FOR THE SENSOR CONTROLLED DISTANCE MEASUREMENT

[75] Inventors: Heiner Herbst, Munich; Hans-Joerg Pfleiderer, Zorneding; Hans-Peter Grassl, Munich, all of Fed. Rep. of Germany

[73] Assignee: Siemens Aktiengesellschaft, Berlin & Munich, Fed. Rep. of Germany

[21] Appl. No.: 172,084

[22] Filed: Jul. 24, 1980

[30] Foreign Application Priority Data

Sep. 10, 1979 [DE] Fed. Rep. of Germany ....... 2936535

[51] Int. Cl.³ .......................... G01C 3/08; G01C 3/32; G06F 15/336
[52] U.S. Cl. .................................. 364/561; 250/201; 354/25; 364/728
[58] Field of Search .............. 364/561, 604, 728, 822; 354/25 R, 25 P; 250/201, 204

[56] References Cited

U.S. PATENT DOCUMENTS

| | | | |
|---|---|---|---|
| 3,777,133 | 12/1973 | Beck et al. .......................... | 364/728 |
| 4,059,756 | 11/1977 | Wilwerding ................... | 354/25 P X |
| 4,135,815 | 1/1979 | Masunaga et al. ............ | 354/25 P X |
| 4,161,033 | 7/1979 | Martinson ......................... | 364/728 |
| 4,178,098 | 12/1979 | Asano et al. ..................... | 354/25 X |
| 4,255,795 | 3/1981 | Hechtenberg ....................... | 364/728 |

Primary Examiner—Felix D. Gruber
Attorney, Agent, or Firm—Hill, Van Santen, Steadman, Chiara & Simpson

[57] ABSTRACT

A circuit for sensor controlled distance measurement is disclosed having two linear image sensors which are positioned to receive corresponding lines of two images derived from an object. The sensor signals are subjected to correlation measurements from which the distance of the object is determined. In the case of circuits of this sort, one endeavors to attain as exact and unfalsified a distance measurement as possible. For this purpose, the sensor signals are digitalized in evaluators, then read via transfer transistors into shift registers which undertake relative position displacements of the sensor signals in a longitudinal direction of the image sensors between individual signal cycles, and are subject to a correlation measurement. The circuit distinguishes itself in that the digital evaluation proceeds completely independently of parameters of the shift register and is thus carried out very precisely. Applications include photographic and electronic cameras.

14 Claims, 8 Drawing Figures

4,370,724

CIRCUIT FOR THE SENSOR CONTROLLED DISTANCE MEASUREMENT

BACKGROUND OF THE INVENTION

The invention concerns a circuit for sensor controlled distance measurement wherein two linear image sensors are provided each having sensor elements. Means are provided for projecting onto the sensor elements segments of lines corresponding to images obtained separately from an object. Evaluator means are connected to the sensor elements for switching between two different switching states in dependence upon the exceeding of a reference charge in the sensor elements so as to digitalize the sensor signals. An evaluating circuit evaluates the digitalized sensor signals to control device means such as a photographic camera. A circuit of this kind is described in German patent application No. P2,838,647.2, incorporated herein by reference. There, the evaluators which are connected to the sensor elements and which undertake a digitalization of the sensor signals consist of portions of circuits of individual stages of a shift register, which undertakes relative position displacements of the sensor signals in a longitudinal direction of the image sensors.

SUMMARY OF THE INVENTION

It is an object of the invention to provide a very precise digitalization of the sensor signals and thus a precise evaluation of the maximum correlation of the sensor signals. This problem is solved in the circuit of the invention by connecting outputs of the evaluator means connecting to the individual sensor elements of the linear image sensors via transfer transistors to inputs of individual stages of two shift registers individually associated with the two image sensors. The last stage of each of the shift registers has an output which is back coupled to an input of its first stage and also is connected with an input of the evaluating circuit means for a serial release of evaluated sensor signals.

An advantage attainable with the invention is that the evaluators in the blocked state of the transfer transistors are completely separated from the stages of the shift registers. Therefore, independently of the parameters or characteristics of individual circuit parts of the shift register burdened with tolerances set by the manufacturer, they can be set back to predetermined voltage values. These voltage values usually are available with as great a precision as possible at the beginning of the integration times for the sensor elements at one or several circuit points of the evaluator circuits.

DESCRIPTION OF THE PREFERRED EMBODIMENTS

DESCRIPTION OF THE PREFERRED EMBODIMENTS

Figure 1:
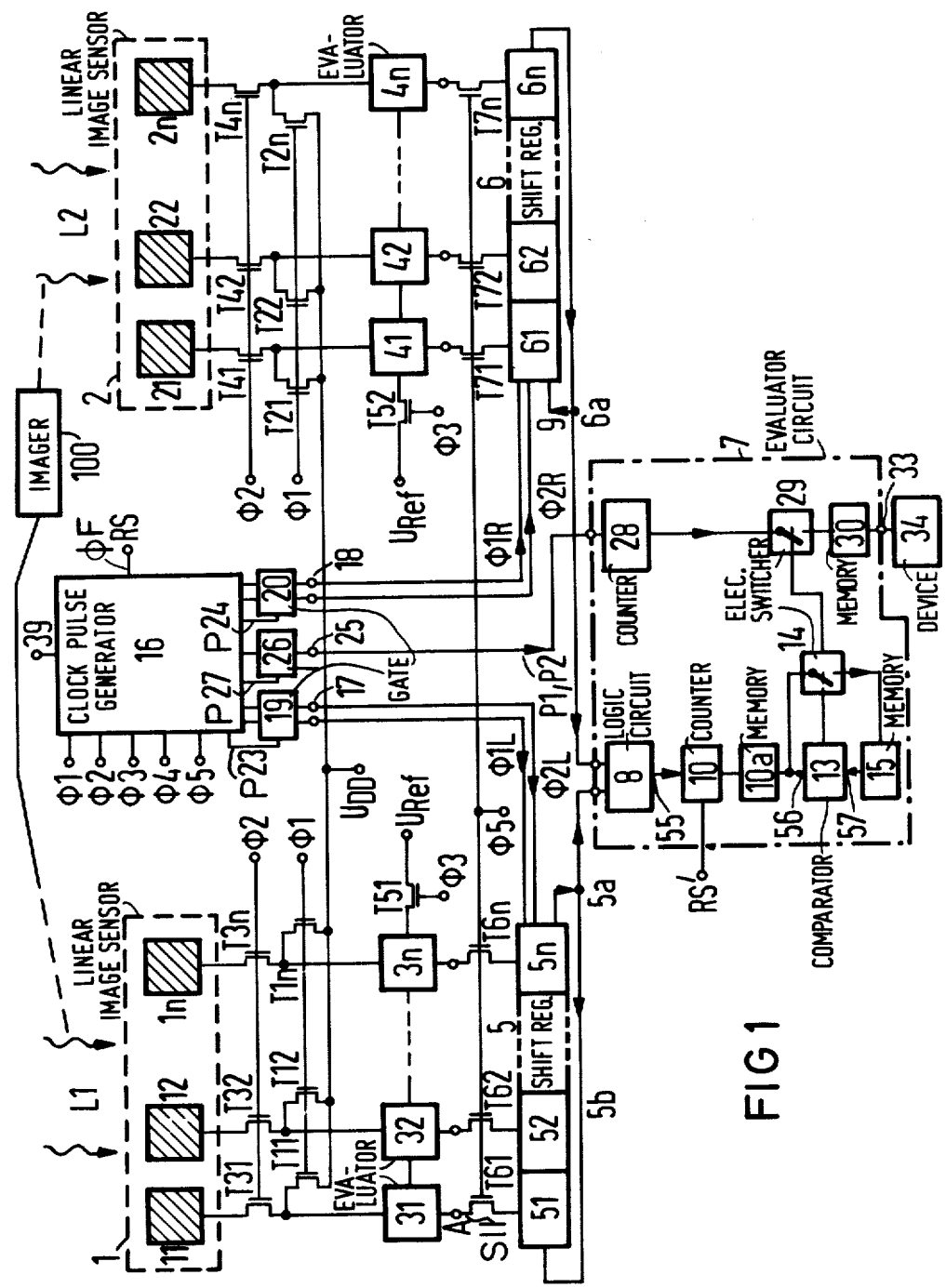
FIG. 1 illustrates a circuit diagram of a first embodiment of the invention.

The circuit represented in FIG. 1 contains two linear image sensors 1 and 2 having sensor elements 11, 12-1$n$ and 21, 22-2$n$. The image sensors 1, 2 are integrated upon a doped semiconductor body of a first conductivity type. If the sensor elements are realized as photodiodes, then the shaded rectangles represent regions arranged on an interface of the semiconductor body having a second conductivity type which is opposed to the first. The sensor elements 11-1$n$ and 21-2$n$ are connected via individually associated switching transistors T11-T1$n$ and T31-T3 as well as T21-T2$n$ and T41-T4$n$ with a lead which is connected with a supply voltage $U_{DD}$. The gate electrodes of the switching transistors T11-T1$n$ and T21-T2$n$ are in each case directed to a common lead, to which is supplied a clock pulse voltage $\phi$ 1, whereas the gate electrodes of the switching transistors T31-T3$n$ and T41-T4$n$ are connected with leads which are at a pulse voltage $\phi$ 2.

The sensor elements 11-1$n$ and 21-2$n$ are connected via the switching transistors T31-T3$n$ and T41-T4$n$ with the inputs of evaluators 31-3$n$ and 41-4$n$.

Figure 2:
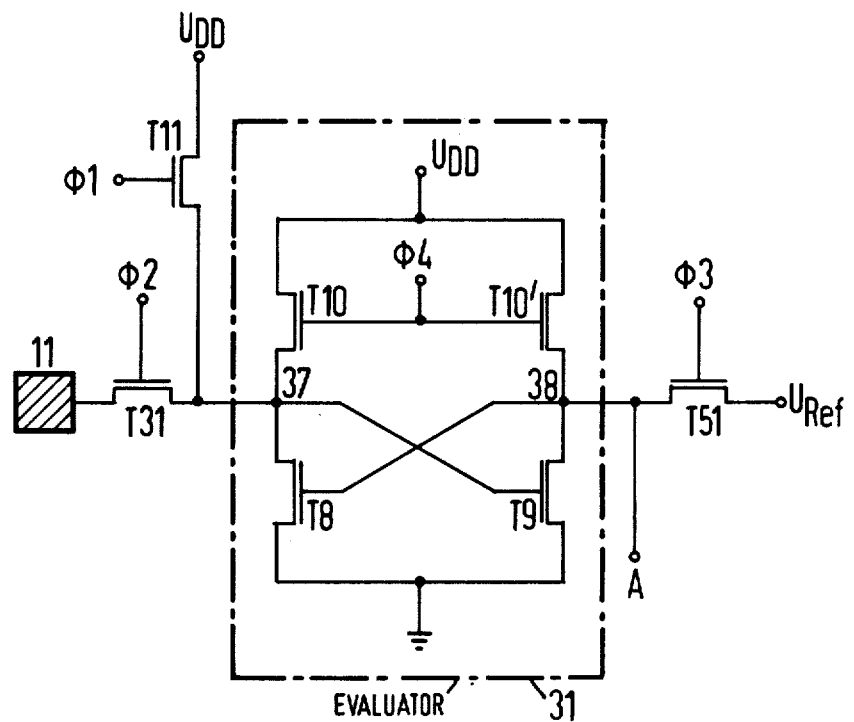
FIG. 2 shows a portion of the circuit of FIG. 1.

A practical circuit design of the evaluators 31-3$n$ and 41-4$n$ is to be specified even more precisely with the use of FIG. 2. Further inputs of these evaluators are connected via common switching transistors T51 and T52, the electrodes of which are connected with a clock pulse voltage $\phi$ 3 to leads at a reference voltage $U_{Ref}$. The evaluators 31-3$n$ and 41-4$n$, in dependence upon the voltages supplied to them via the switching transistors T31-T3$n$ and T41-4$n$, can assume one of two possible switching states. Their output signals S11-S1$n$ and S21-S2$n$, which can be obtained at A, in each case correspond to the logic voltage level "1" or "0" according to the assumed switching state. They are supplied via transfer transistors T61-T6$n$ and T71-T7$n$, the gate electrodes of which are provided with a common clock pulse voltage $\phi$ 5, to the inputs of the individual stages 51, 52-5$n$ and 61, 62-6$n$ of two shift registers 5 and 6 associated individually to the image sensors. These shift registers are preferably designed as two-phase dynamic shift registers. The shift register 5 displays two inputs which are connected with clock pulse voltages $\phi$ 1L and $\phi$ 2L, whereas the shift register 6 has two inputs to which the clock pulse voltage $\phi$ 1R and $\phi$ 2R are supplied. The output 5$a$ of the stage 5$n$ is connected on one side via a line 5$b$ with the input of stage 51, and on the other side is connected to a first input of a logic circuit 8 which is arranged in an evaluating unit 7. The output 6$a$ of the stage 6$n$ is directed in a corresponding manner via a line 9 to the input of stage 61, and is connected on the other side with a second input of 8.

The logic circuit 8 has connected to it a counter 10, the output of which is connected via a memory 10$a$ with the first input of a digital comparator 13 and via an electronic switch 14, with a memory 15. The output of the memory 15 is directed to a second input of the digital comparator 13.

A clock pulse generator 16 is provided with outputs for the clock pulse voltages $\phi$ 1 through $\phi$ 3 and $\phi$ 5. Via further outputs 17 and 18, the clock pulse voltages $\phi$ 1L and $\phi$ 2L as well as $\phi$ 1R and $\phi$ 2R are released, whereby a gate circuit 19 is arranged in series to the outputs 17 and, in series to the outputs 18, a gate circuit 20 is arranged. The control inputs of 19 and 20 are connected via lines 23 and 24 with control signals which are still to be specified more precisely. The clock pulse generator displays a further output 25, to which a further gate circuit 26 is arranged in series. This gate is controlled via a line 27 with a further control signal. The output 25 is connected with the input of a counter 28, the output of which is connected via an electronic switch 29 with a memory 30. The output 33 of the memory 30 is connected with a device 34 which is to be specified further below.

FIG. 2 shows a practical design of the evaluators 31-3n and 41-4n utilizing evaluator 31 as an example. It consists of a flip-flop circuit with the switching transistors T8 and T9 and the transistors T10 and T10' which are operated as switchable load elements. The source leads of T8 and T9 are connected via a common lead 35 to the reference potential of the circuit, and the drain leads of T10 and T10' are connected via a common lead to the supply voltage $U_{DD}$. The input node of the evaluator 31 is designated 37, and the output node connected with output A is designated 38. Between the gate electrodes of T8 and T9 and the nodes 37 and 38 there exists a cross coupling. The gate electrodes of T10 and T10' are connected via a common lead with a clock pulse voltage $\phi$ 4. The circuit parts T11, 11 and T31 as well as T51, which are connected to the nodes 37 and 38, already described in FIG. 1.

The object distance measurement system used in this invention includes two optical devices shown as a single unit imager at 100 in FIG. 1 via which two separate images are created, the distance-dependent relative positions of which are evaluated. The light beams L1 in FIG. 1 thereby proceed from the object whose distance is to be determined. Via a first optical device, they project an image of the object onto the plane of the image sensor 1 which is positioned to receive a line segment of the image. In an analogous manner, the light beams L2, which are provided via a second optical device from the object, project a second image of the same onto the plane of the image sensor 2, which also is positioned to receive the line segment when the object is located at a predetermined distance, for example, at the distance "infinite". If the distance of the object changes with respect to the predetermined value, then the line segments which were projected onto the image sensors 1 and 2 are displaced correspondingly in the longitudinal direction of the image sensors. The size of the mutual displacement thereby represents a measurement for the actual distance of the object. In a similar method of distance measurement using the above-specified relative displacement of two images of the object, instead of linear image sensors surface related arrangements of photodiodes are provided, as known for example from the magazine "Electronics" of Nov. 10, 1977, pages 40, 42, 44, incorporated herein by reference.

Figure 3:
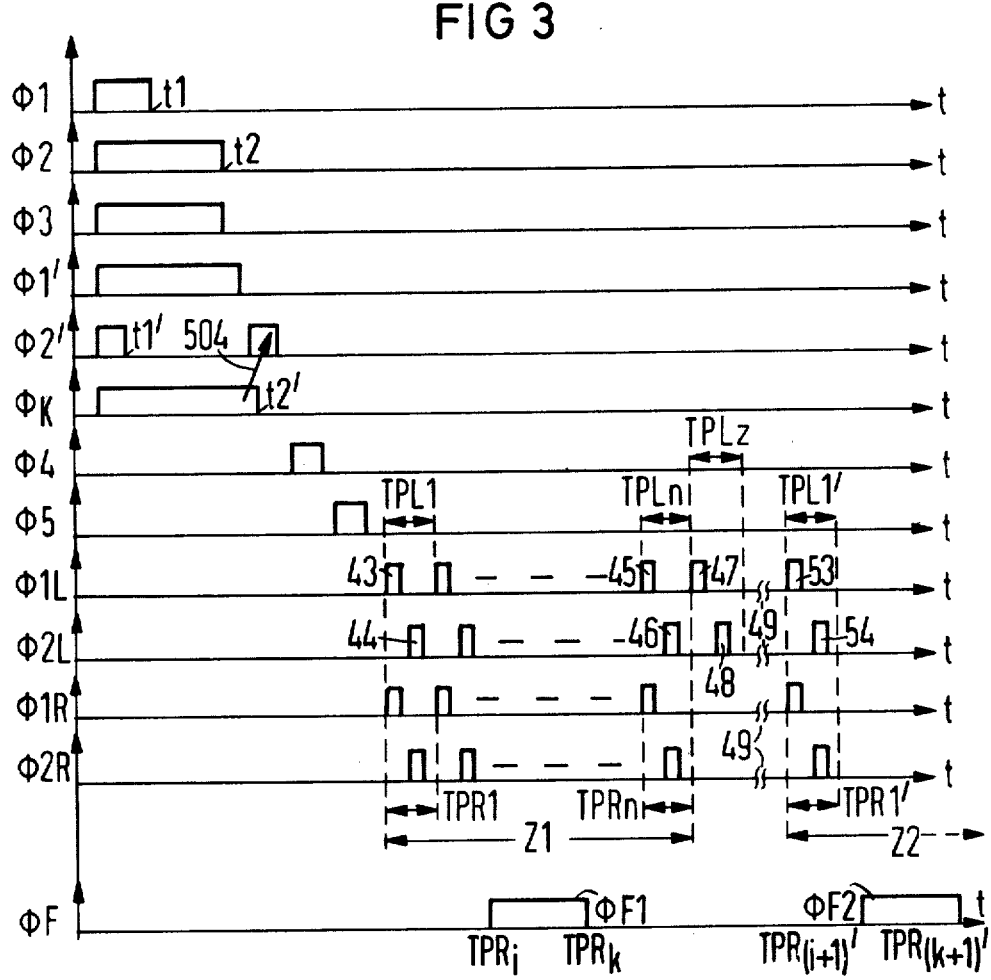
FIG. 3 shows voltage-time diagrams for explanation of FIGS. 1 and 2.

The manner of operation of the circuit according to FIGS. 1 and 2 proceeds in connection with the pulse-time diagrams according to FIG. 3. If a trigger pulse is supplied to an input 39 of the clock pulse generator 16, then this releases first clock pulses $\phi$ 1 and $\phi$ 2. With this, the sensor elements such as 11, and the input nodes such as 37 of the evaluators, are set back to the supply voltage $U_{DD}$ via the transistors, for example, T11 and T31, connected to be conducting. A simultaneous starting clock pulse $\phi$ 3 switches T51 into the conducting state, so that the output node 38 is placed at the reference voltage $U_{Ref}$. With disconnection of the clock pulse $\phi$ 1, charge carriers which are generated by means of the incident light beams L1, or respectively, L2 begin to collect in the sensor elements, for example, 11, whereby, a voltage drop arises in the sensor elements. The larger the optically generated charges which in each case have collected in the sensor elements 11-1n and 21-2n are, the more strongly the potential decreases at the associated input node, for example, 37 of the evaluator. The time span between the end of the clock pulse $\phi$ 1 to the point in time t1 and the predetermined end of the pulse $\phi$ 2 to the point in time t2 is designated as integration time. Only within this time span do optically generated charges collect in the sensor elements. After ending of the clock pulse $\phi$ 2 and after ending of the clock pulse $\phi$ 3, a clock pulse $\phi$ 4 from the clock pulse generator 16 is placed at the gate electrodes of T10 and T10', so that the flip-flop circuits of the evaluator are activated. At the output node, for example 38, for when at node 37 a potential drop occurs below the reference voltage $U_{Ref}$, a voltage occurs which approximately corresponds to the supply voltage $U_{DD}$ (logic "1"). If on the other hand the voltage at node 37 does not fall below $U_{Ref}$, then the node 38 proceeds to a potential which approximately corresponds to the reference potential at lead 35 (logic "0"). With this, each evaluator releases a digitalized sensor signal, for example S11, the value of which is dependent upon the attainment or non-attainment of a reference charge in the individual sensor elements which is present precisely when the potential at node 37 at point in time t2 approaches the potential of node 38 which was set back to the voltage $U_{Ref}$. With the occurrence of a clock pulse $\phi$ 5 then, the digitalized sensor signal, for example S11, is supplied to the inputs of the associated stages for example 51, of the shift registers 5 and 6 and are stored in these registers.

Following this, the clock pulse generator 16 delivers clock pulse sequences $\phi$ 1L, $\phi$ 2L, $\phi$ 1R, and $\phi$ 2R which displace the information contained in the stages of the shift registers 5 and 6 by one step. Before the occurrence of the clock pulses 43 and 44 which belong to a clock pulse period TPL1, the sensor signal S1n appears at the output 5a. The clock pulses 43 and 44 displace the information S1n into the stage 51 and the information S1(n−1) to the output 5a, and so on. By means of the clock pulses 45 and 46 of the clock pulse period TPLn, finally after a complete information cycle, again the sensor signal S1n arrives at the output 5a. There follows a clock pulse period TPLz with the clock pulses 47 and 48, by means of which the sensor signal S1(n−1) appears at the output 5a. After a following blanking gap which is designated 49, the clock pulses 53 and 54 of the clock pulse period TPL1' displace the sensor signals again by one step further, so that S1(n−1) arrives at stage 51 and S1(n−2) is connected through to the output 5a.

In a first readout cycle Z1 which encompasses the clock pulse periods TPL1 through TPLn, therefore, the sensor signals S1n through S1 and again S1n are released serially at the output 5a. In a second read-out cycle Z2, which encompasses the clock pulse periods TPL1' and n−1 further clock pulse periods there proceeds a second serial release of all sensor signals of the image sensor 1, whereby the signals S1(n−1) through S1 and again S1n and S1(n−1) appear at 5a. Within the first read-out cycle Z1, the shift register 6 is also provided with n clock pulse periods TPR1 through TPRn, while the clock pulses 47 and 48 lack corresponding pulses. This has the result that at the beginning of Z2, the sensor signal S2n lies at the output 6a and the signal S1(n−1) lies at the output 5a.

With this, in the first read out cycle Z1, the signal pairs S1n and S2n, S1(n−1) and S2(n−1) and so on are read-out at 52 and 62 serially, in the second read-out cycle on the other hand, the signal pairs S1(n−1) and S2n, S1(n−2) and S2(n−1) and so on are read out. The serially read out information of the shift registers 5 and 6 are thus displaced with respect to one another in two consecutively following read-out cycles in each case one signal width. After n read out cycles, they then again have the same time related association as in cycle Z1. In FIG. 1, this displacement can be attained such that the gate circuit 20 is blocked via line 24 by an inhibit signal P24 during the appearance of the clock pulses 47 and 48, that is, between the clock pulse periods TPRn and TPR1'. In this time period, the gate circuit 26 can be opened via the control line 27 by an enable signal P27, so that one of the pulses 47 or 48 or a pulse derived from these appears at the output 25 as a displacement pulse P1 (not shown in FIG. 3). This displacement pulse P1 thereby characterizes the beginning of a new read-out cycle and a mutual displacement of the sensor signals which are read out serially at the outputs 5a and 6a in each case by one signal width.

The sensor signal pairs which were read out within a read-out cycle, for example Z1, are evaluated in the logic circuit 8 according to the exclusive OR function. Therefore, at the output 55 of 8, there always occurs an output pulse when the digital signals supplied on the input side via 5a and 6a coincide. If they do not coincide, then no output pulse is released from 8. The partial circuit 8 can however also be designed such that it only indicates the coincidence of two "1" signals or two "0" signals at its inputs by means of an output pulse. The counter 10, which before the start of each read-out cycle, (in the blanking intervals 49) is set back to zero, then counts the number of coincidences within one such cycle.

The counter 10 is connected to be operative only during a portion of each read-out cycle. This portion is determined by a pulse $\phi$ F at RS which is released from 16 to counter 10 at RS'. If one assumes that the counter 10 in the readout cycle Z1 counts the coincidences within the clock pulse periods $TPR_i$ through $TPR_k$, whereby the difference k−1 amounts approximately to n/2 or 3n/4, then in the readout cycle Z2, it counts the coincidences within the clock pulse periods $TPR'_{i+1}$ through $TPR'_{k+1}$. If one considers the pulses $\phi$ F1 and $\phi$ F2 in each case as "read-out windows", then the signals of the shift register 6 have been displaced in the window $\phi$ F2 with respect to the window $\phi$ F1 by a signal width to the left (FIG. 3). In the next read out cycle Z3, in which the corresponding pulses $\phi$ F3 encompasses the same clock pulse periods as in Z2, then the signals from 5 have been displaced in the "window" $\phi$ F3 by a signal width toward the right. If the "window" is generally displaced in the first read-out cycle Z1 and in the further read out cycle Z3, Z5, Z7 and so on by a clock pulse period length in each case to the right, then this corresponds to an alternating displacement of the sensor signal sequences available at 6a, or respectively, 5a in the window $\phi$ F in each case by a signal width to the left, or respectively, the right. Those pulses $\phi$ F which would encompass the evaluator signals which were derived from the line beginning and from the line end of one of the sensor element lines, simultaneously are suppressed by the clock pulse generator 16. Therefore it results that the "windows" $\phi$ F disconnect the evaluation of those sensor signals which were derived from the beginning and end segments of the projected line segments which are next to one another in exchanged association, so that they provide no information concerning the actual brightness curve along the line segment.

If the counter result which is supplied to the input 56 of the digital comparator 13 is larger than the digital signal which is present at its input 57, then the control inputs of the switches 14 and 29 are provided with a comparator signal, so that both switches transmit the signals at their inputs to the output in each case. After the counter result of the coincidences of the first information cycle Z1 is supplied as a first digital signal to the memory 15, and via this to the input 57 of the comparator, now only a counter result of a further information cycle Z1 is taken into the memory 15 which is larger than the largest in each case which was stored ahead of time. The displacement pulses P1, P2 (not shown is FIG. 3) and so on, which appear at the end of the information cycles Z1, Z2 and so on, are counted in the counter 28. Since switch 29 is activated synchronously with switch 14, it always transmits the count of the counter in each case from 28 to the memory 30 in the case of the appearance of a larger counter result in the counter 10. Thus, in memory 30, after n information cycles, the number of the displacement pulses Pi is stored which characterizes that information displacement between the sensor signals of the shift registers 5 and 6 wherein the largest number of coincidences occurs. In other words: the number of the shift pulses Pi which are stored in the memory 30 releases the relative displacement of the sensor signals circulating in the shift registers 5 and 6 whereby a maximum correlation of the sensor signals which are compared with one another exists. The blanking gaps 49 which were indicated in FIG. 3, which for example are required for the setting back in each case of the counter 10 to 0, are generated by means of a corresponding blocking of the gate circuits 19 and 20 via respective inhibit signals P23 and P24 on their control lines 23 and 24. The setting back is accomplished by applying a reset pulse from terminal RS of the clock pulse generator 16 to the terminal RS of the counter 10.

The digital signal appearing at output 33 of the memory 30 is supplied to a device 34 which can be conceived of as an indicating device, which, after a corresponding coding of the digital signal, delivers a digital or analog indication of the distance of the object. On the other hand, the device 34 could also consist of an essentially known adjustment device of a photographic or electronic camera, which sets the distance of a lens which is movable with respect to a focal plane such that the object is sharply imaged on this focal plane. A device of this kind is specified, for example, in German patent application No. P 2,813,915.3, incorporated herein by reference, and in the magazine "Electronics" of Nov. 10, 1977 on the pages 40 through 44, also incorporated herein by reference.

Figure 4:
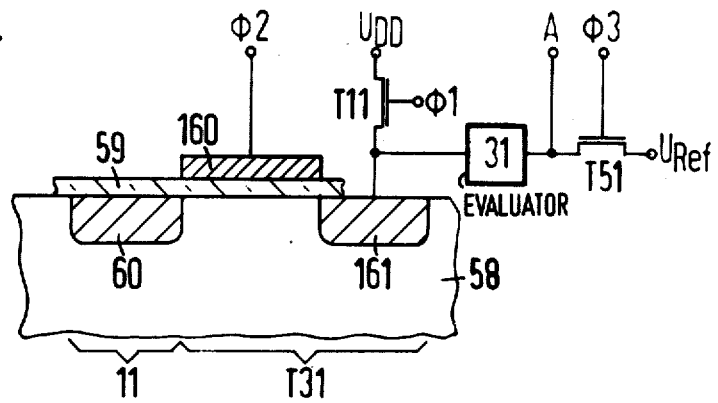
FIGS. 4 through 6 show alternate designs of a portion of the circuit of FIG. 1.

FIG. 4 shows a preferred circuit design of the sensor elements 11-1n and 21-2n as well as the adjacent circuit parts using as an example sensor element 11. Upon a doped semiconductor body 58, for example, of p-doped silicon, a thin electrically insulating layer 59, for example of $SiO_2$, is provided. The image sensor 11 is designed as a photodiode which consists of the n-doped semiconductor region 60. This region simultaneously also forms the source region of the transistor T31. The gate of T31 is arranged on the insulating layer 59 and is designated 160. The drain region of T31 has the reference symbol 161. This region is connected on the one side via transistor T11 with a lead which is connected with the constant voltage $U_{DD}$ and is further connected with the input of the evaluator 31. The circuit parts T51 and A were already described with the use of FIG. 2.

Figure 5:
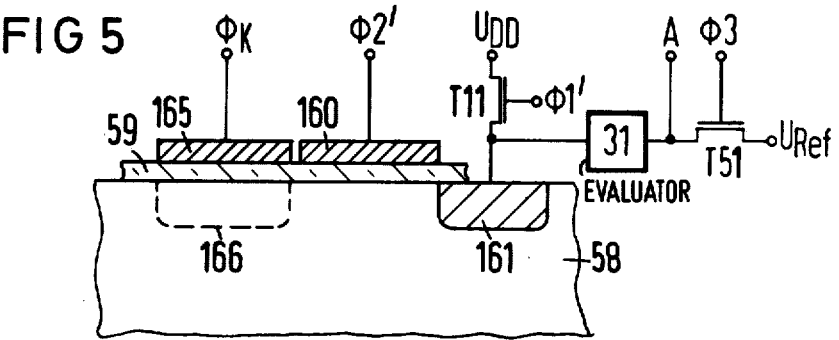

FIG. 5 shows an alternative circuit to FIG. 4. According to this, the sensor element 11 consists of a MIS capacitor (metal-insulating layer-semiconductor-capacitor), which has a gate 165 arranged on the insulating layer 59. The gate 165 is, for example, prepared from highly doped polycrystalline silicon and lies at a clock pulse voltage $\phi$ K, under the influence of which a space charge region 166 forms in the semiconductor body 58. The further circuit parts of FIG. 5 correspond to the circuit parts of FIG. 4 which are provided with the same reference symbols, whereby the transistor T11 has a clock pulse voltage $\phi$ 1' fed thereto and the transistor T31 has a clock pulse voltage $\phi$ 2' fed thereto. The simultaneously starting clock pulses $\phi$ 1', $\phi$ 2' and $\phi$ K up to the point in time t1' bring about a setting back of the MIS capacitor in the region of the interface 58a of the semiconductor body 58 approximately to the value of the supply voltage $U_{DD}$. At the point in time t1', in the MIS capacitor which is further provided with $\phi$ K, the integration time begins, during which optically generated charge carriers are collected. With the end of $\phi$ K at the point of time t2', also the end of the integration time is attained. Shortly before the point in time t2', a new clock pulse $\phi$ 2' is applied, so that a charge takeover from 166 to 161 can take place, indicated by the arrow 504 (FIG. 3). This charge takeover at the output of the evaluator brings about a corresponding change in potential. The clock pulse $\phi$ 1' must be disconnected before this charge takeover, as indicated in FIG. 3.

Figure 6:
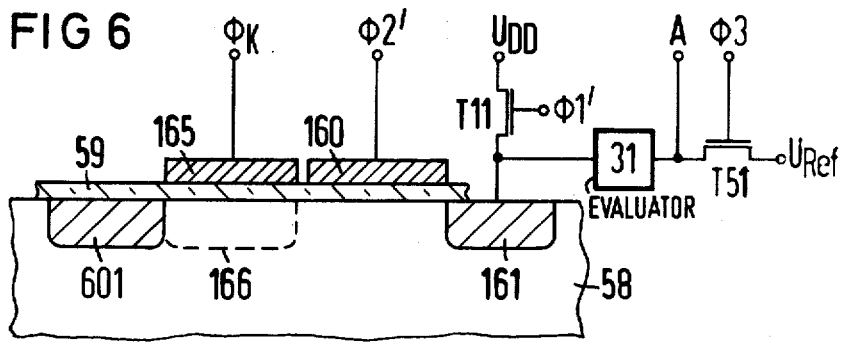

FIG. 6 differs from FIG. 5 since a photodiode 601 is arranged next to the MIS capacitor 165, 166, and indeed on the side turned away from T31. The gate electrode of T31 is connected with the pulse voltage $\phi$ 2', while the gate electrode of T11 is supplied with the clock pulse voltage $\phi$ 1'.

The capacitance of the sensor element 11 according to FIG. 5 is larger than the capacitance of the sensor element 11 according to FIG. 4, whereas the capacitance of the sensor element 11 according to FIG. 6 is larger than that of the sensor element according to FIG. 5.

Figure 7:
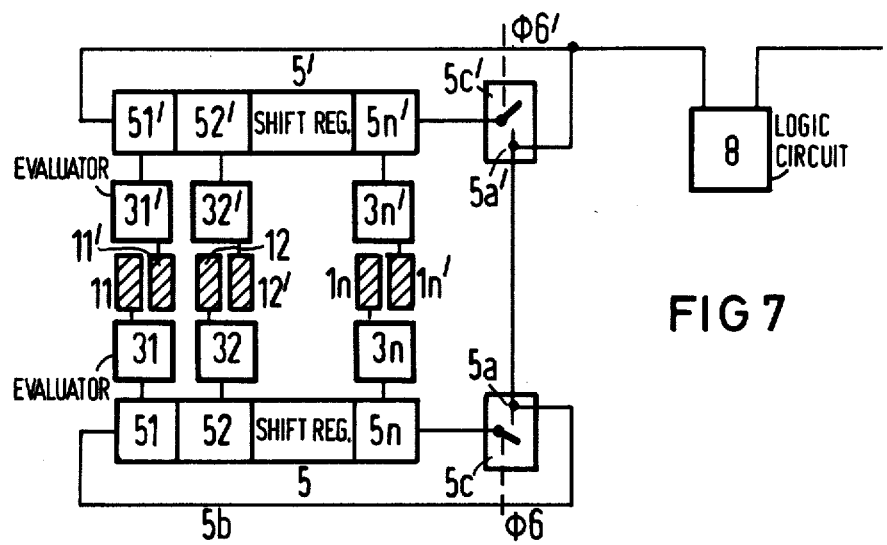
FIG. 7 shows a second embodiment of the invention.

In FIG. 7, a second embodiment example of the invention is represented, whereby two circuits according to FIG. 1 are provided with a common evaluating part 7 and common device 34 which are connected to this. The components of the partial circuit arranged in FIG. 1 on the left side of the evaluating part 7 are provided in FIG. 7 with the same reference symbols. Thereby, the individual sensor elements 11, 12-1n in the longitudinal direction of the image sensor 1 are designed so narrow that they correspond approximately to half the dimension of the evaluator 31, 32-3n. In these evaluators, for the sake of simple representation, also the switching transistors T11, T31 as well as T61 and so on are included. The corresponding components of the second circuit according to FIG. 1 are provided in FIG. 5 in each case with reference symbols which are supplemented by a prime mark. As can be seen, the sensor elements 12-1n of the one image sensor are arranged in the gaps between the sensor elements 11', 12'-1n' of the other image sensor. In the case of this embodiment example, double the number of sensor elements can be housed upon a sensor length corresponding to FIG. 1, so that the resolution of the line segments projected onto the sensor elements is significantly greater than in FIG. 1. In order to prevent a mutual interference of the information cycle in the shift registers 5 and 5', alternatingly activatable electronic switches Sc and Sc' are provided, which alternately connect one of the outputs 5a and 5a' with the one input of the logic circuit 8 and with the input of the corresponding first stage 51, or respectively, 51' of the shift registers. They are controlled by means of clock pulse voltages $\phi$ 6 and $\phi$ 6'. The individual clock pulse periods of $\phi$ 6 are separated from one another by means of intermediate periods which display the same length as the clock pulse period. Then the clock pulse periods of $\phi$ 6' fall together with these intermediate periods. The circuit represented in FIG. 7 is to be supplemented on the right side of the evaluating part 7 by a corresponding arrangement of two further image sensors and the evaluators associated to them and shift registers, whereby their sensor elements are also designed so narrow that they correspond to half the evaluator width, seen in the longitudinal direction of the image sensors.

Figure 8:
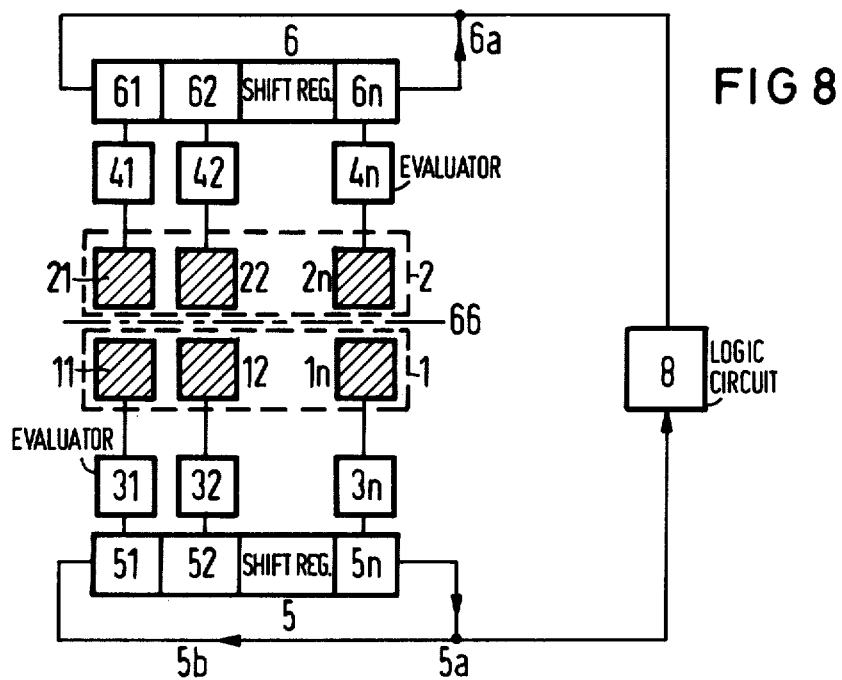
FIG. 8 shows a third embodiment of the invention.

Finally, FIG. 8 shows a circuit corresponding to FIG. 1, whereby the image sensors 1 and 2 are arranged next to one another, so that their sensor elements 11, 12-1n and 21, 22-2n are arranged in two lines which lie adjacent one another. The evaluators 31, 32-3n and 41, 42-4n in each case also contain the switching transistors T11, T21, T31 and T41, as well as T61, T71 and so on. This embodiment example can be drawn upon if the images of the object in each case are projected only by half onto the plane of the image sensors from 1 and 2, whereby the upper half of the one image falls upon the part of the focal plane which lies above the dividing line 66, while the lower half of the other image is projected on the part of the focal plane which lies under dividing line 66. The line segments which were evaluated by means of the image sensors 1 and 2 thereby lie at the boundaries in each case of the halves of the images, which are adjacent to the dividing line 66. Such image projection techniques is also specified in the German patent application No. P2,838,647.2, incorporated herein by reference.

The circuits specified and represented can with special advantage be entirely or partially monolithically integrated upon a doped semiconductor body. Thereby, the semiconductor body, for example 58, is designed preferably p-conducting and the remaining circuit structure is embodied in MOS n-channel engineering. The semiconductor body lies at a reference potential, whereby the stated voltages and potentials display a positive sign with respect to this in each case. In the case of an n-conducting semiconductor body and MOS p-channel engineering, these signs become negative. The embodiment examples which were specified and represented display stops in the region of the image sensors 1 and 2, in which apertures are provided through which an exposure of the sensor elements proceeds.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A circuit for sensor controlled distance measurement, comprising: two linear image sensors each having sensor elements; means for projecting onto the sensor elements segments of lines corresponding to two images obtained separately from an object; evaluator means connected to the sensor elements for switching between two different switching states in dependence upon the exceeding of a reference charge in the sensor element so as to digitalize sensor signals; an evaluating circuit means for evaluating the digitalized sensor signals in dependence upon difference relative position displacements with respect to a maximum correlation; device means connected to the evaluating circuit means for indicating a range of said object; outputs of the evaluator means connected via transfer transistors in parallel to inputs of individual stages of two shift registers individually associated with the two image sensors, the last stage of each shift register having a output which is back coupled to an input of its first stage and also is connected with an input of the evaluating circuit means for a serial release of evaluated sensor signal; and clock pulse generator means for supplying clock pulse signals to control said evaluator means to digitalize the sensor signals, clock pulse signals to gates of said transfer transistors, and clock pulse signals to clock pulse inputs of said two shift registers for shifting information contained therein, said transfer transistors being operated by said clock pulse generator means in cooperation with said evaluator means and said shift registers in such a way so as to disconnect outputs of the evaluator means from the individual shift register stage inputs during digitalization of the sensor signals in the evaluator means, and to transfer the digitalized sensor signals in the evaluator means to said inputs of the individual shift register stages after digitalization.

2. A circuit according to claim 1, wherein the clock pulse generator means connected with the clock pulse inputs of the shift registers produces clock pulse signals such that after each information cycle in both shift registers one of them is provided with an additional clock pulse period so that an information displacement of one step occurs with respect to the other shift register.

3. A circuit according to claim 2 wherein the evaluating circuit means has an input side logic circuit to which is connected a first counter, the output of the first counter connecting to a first memory, the output of which on the one side connecting with a first input of a digital comparator and on the other side via an electronic switch and a second memory connects with a second input of the comparator, a second counter is connected to a further output of the clock pulse generator from which clock pulses of an additional clock pulse period can be obtained, an output of the second counter being connected via a second electronic switch to a third memory, both electronic switches being provided with control inputs which are connected to an output of the comparator, and an output of the third memory being connected with an output of the evaluating circuit means.

4. A circuit according to claim 1 wherein each linear image sensor contains sensor element pairs, a first sensor element of each pair connecting to a first set of said evaluator means and a second sensor element of each pair connecting to a second set of said evaluator means, the first set of evaluator means connecting to a first shift register and the second set connecting to a second shift register, each image sensor element being dimensioned in a longitudinal direction of the linear image sensor such that they correspond approximately to half of the corresponding evaluator means dimension in this direction, and a last stage of the first and second shift registers associated with each of the linear image sensors being combined in alternate fashion by activatable electronic switching means.

5. A circuit according to claim 1 wherein the two linear image sensors are arranged parallel next to one another and the evaluator means and shift registers in each case lie on a corresponding side of the associated linear image sensor.

6. A circuit according to claim 1 wherein the evaluator means connected to the sensor elements in each case have an input connected via a switching transistor with a supply voltage source.

7. A circuit according to claim 1 wherein the evaluator means connected to the sensor elements in each case have a further input connected via a further switching transistor with a reference voltage source.

8. A circuit according to claim 1 wherein the sensor elements are designed as photodiodes.

9. A circuit according to claim 1 wherein the sensor elements are designed as MIS (Metal-Insulator-Semiconductor) capacitors.

10. A circuit according to claim 1 wherein the sensor elements comprise MIS (Metal-Insulator-Semiconductor) capacitors to which photodiodes are arranged in adjacent fashion.

11. A circuit according to claim 1 wherein with the exception of the device connected to the evaluating circuit means, the circuitry is at least partially monolithically integrated upon a doped semiconductor body.

12. A circuit according to claim 1 wherein said means for projecting and device means are designed for range finding in a camera.

13. A circuit according to claim 12 wherein said device means controls a focus adjustment to project an image on a predetermined focal plane.

14. A circuit according to claim 1, wherein the clock pulse generator means supplies clock pulses to the transfer transistors such that the outputs of the evaluator means are disconnected from the individual shift register stage inputs during shifting in the shift registers.

* * * * *